Aug. 18, 1970  E. W. JACKOBOICE  3,524,269
MOUNTING MEANS FOR VEHICULAR IMPLEMENTS
Filed Sept. 15, 1967
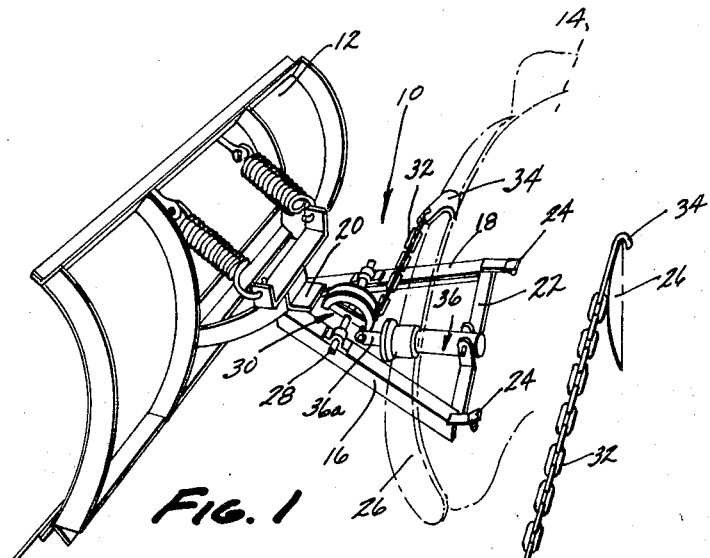
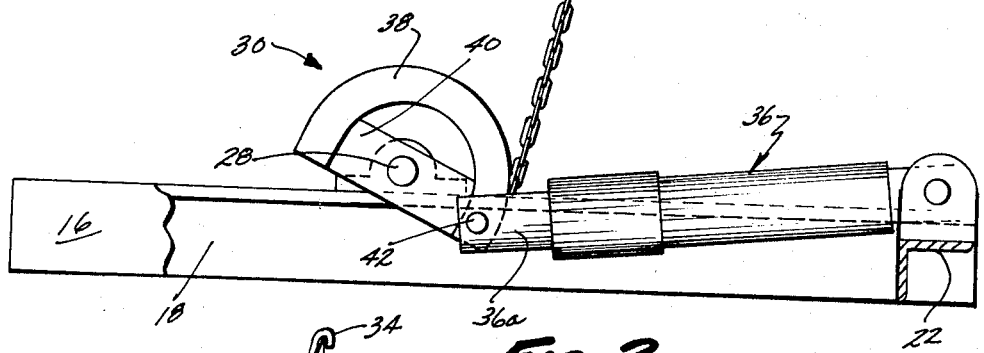
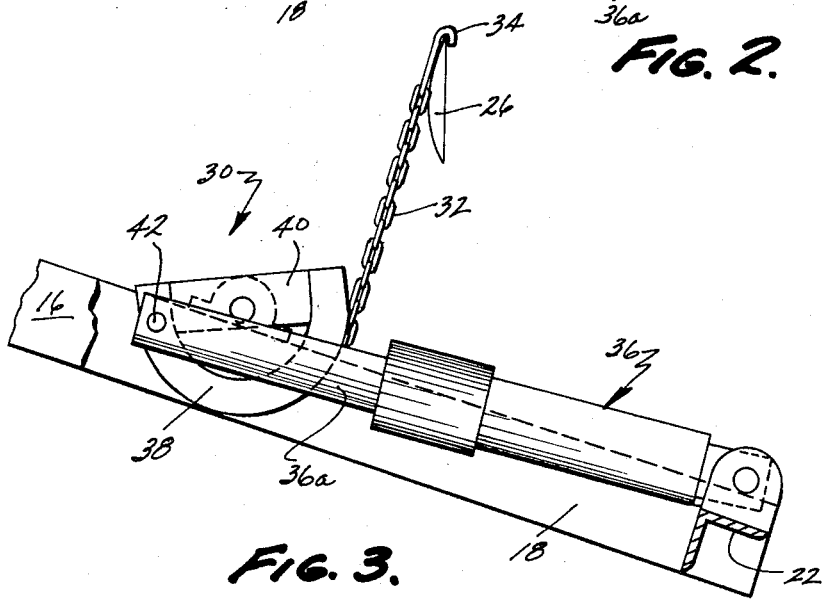
INVENTOR.
EDWARD W. JACKOBOICE
ATTORNEYS

United States Patent Office 3,524,269
Patented Aug. 18, 1970

3,524,269
MOUNTING MEANS FOR VEHICULAR IMPLEMENTS
Edward W. Jackoboice, Grand Rapids, Mich., assignor to Monarch Road Machinery Company, Grand Rapids, Mich., a corporation of Michigan
Filed Sept. 15, 1967, Ser. No. 667,951
Int. Cl. E01h 5/04
U.S. Cl. 37—42          6 Claims

ABSTRACT OF THE DISCLOSURE

An elongated frame pivotally connectable at or near one end to the undercarriage of a vehicle and extending forwardly thereof beneath the level of the bumper to carry an implement such as a snowplow blade in front of the vehicle, at the forward end of the frame. A take-up drum with curved peripheral portions is rotatably mounted on the frame, and a flexible tension member is secured between the drum and the bumper of the vehicle. A power cylinder is mounted on the frame with its ram or piston connected to the take-up drum to rotate the latter upon actuation of the cylinder, thereby winding at least some of the tension member upon the periphery of the drum and lifting the frame and its implement with respect to the bumper, and thus to the vehicle and the roadway therebeneath.

BACKGROUND

Attachment-type implements for general-utility vehicles have long been in use, and their usage seems to increase with each passing year. Implements such as snowplows and the like are typically mounted on frames extending forwardly of the vehicle, which may be raised and lowered to operate and control the implement through the use of hydraulic power cylinders or other like pressure-differential motors. Normally, the frame for the implement is pivotally attached at its rear to the vehicle, with the forward portions of the frame being suspended from what is in effect a lever arm which extends outwardly from the front of the vehicle well above its bumper, ordinarily from in front of the grill. A power cylinder is normally connected between this lever arm and a point on the vehicle beneath it, such as the bumper, so that the ram or piston of the cylinder raises the implement frame by pushing upwardly on the lever arm, which in turn pulls the frame and implement upwardly by a chain or like tension member extending therebetween.

This arrangement has been the source of several problems, and it has also detracted from the overall performance of the implement, even though the arrangement has long been in use and its shortcomings have long been well known. In the first place, the location of the component parts such as the aforementioned lever projecting ahead of the grill of the utility vehicle not only greatly detracts from the looks the vehicle was designed to have but is decidedly a significant causative factor in damage to person, property, to the vehicle, and to these component parts themselves. That is, the location and outwardly-extending prominence of these components produces a strong likelihood of their accidentally striking other objects, particularly when the implement and frame are removed for storage, as during those lengthy times during the year when the implement has no use. Removal of the plow and frame completely exposes to everything in the path of the vehicle all of the component parts located in front of the grill and extending ahead of the bumper. It is common knowledge that these components are very frequently damaged, either accidentally or through the neglect of the driver, who it seems often forgets that the bumper on his vehicle is not its forward-most protuberance, as is the case in other vehicles. Thus, as stated, the system described has produced considerable damage and loss, both with respect to people and other property, and also with respect to itself. However, this, as well as the cluttered appearance which it creates, has heretofore been grudgingly accepted as an unfortunate but inescapable incident of using an implement of this type.

SUMMARY OF THE INVENTION

The present invention provides an apparatus for movably mounting snowplows and other such vehicular implements, wherein the component parts of the apparatus are located substantially entirely beneath the level of the bumper on the vehicle and are totally absent from the area of its grill and other like frontal portions. This eliminates the cluttering, cumbersome, and menacing presence at the front of the vehicle always integrally associated previously with such implements. This very greatly improves the appearance of the vehicle; further, however, when the implement is disconnected and removed during a season when it is not needed, the entire mounting means of the invention is also removed, leaving nothing at the front of the vehicle to protrude outwardly and provide a source of damage and loss. Further, the mounting means of the invention provides a new lifting mechanism for implements of this general type, having a new manner of operation and providing superior results in which the amount of implement lift achieved by a given excursion of the power cylinder piston is maximized.

Briefly stated, the mounting means of the invention comprises a rigid support frame on which the implement is mounted, which frame is pivotally attachable to the undercarriage of the vehicle, with a take-up drum means mounted on such support frame for rotary movement with respect thereto. A flexible tension member is attached to the drum means at one end and has a hooking member at its other end which is removably attachable to the vehicle bumper. A power-operated driver means such as a hydraulic power cylinder is provided for turning the drum with respect to the frame to entrain increasing amounts of the tension member about the periphery of the drum, effectively shortening the tension member and thereby lifting the frame and the implement carried thereon upwardly, toward the bumper.

Structural features of the apparatus of the invention and its complete nature will become increasingly apparent following a consideration of the ensuing specification and its appended claims in which the invention is defined, particularly when these are taken in conjunction with the accompanying illustrative drawings setting forth a preferred embodiment of the invention.

DRAWINGS

FIG. 1 is a lateral perspective view of an implement mounted in accordance with the invention, a portion of a typical utility vehicle being shown in phantom;

FIG. 2 is a fragmentary side elevation of the mounting means of the invention in a first operative position; and FIG. 3 is a fragmentary side elevation of the mounting means in a second operative position.

PREFERRED EMBODIMENT

The basic nature of the mounting means 10 of the invention is best seen in FIG. 1, where it is illustrated mounting an exemplary implement such as a snowplow 12 to a carrying vehicle 14, shown in phantom. The mounting means 10 includes, firstly, a support frame having a pair of spaced support members 16 and 18 which converge together at their forward ends, near the plow 12, where they are rigidly connected by a cross-plate 20 or the like. The support members 16 and 18 are strong, rigid beam elements which, as illustrated, may be made from angle steel or other like stock. At their rearward ends, the support members diverge apart and are interconnected by a rigid cross-member 22. At this end, the support members each have secured to them a pivotal mounting element 24, which may for example be an annular or tubular part adapted to slidably receive a rigid cylindrical mounting bar (not specifically shown) attached to the undercarriage or chassis of the vehicle, beneath the bumper 26 thereof. As will be understood, pivotal mounting of frame members such as supports 16 and 18 to the undercarriage of a utility vehicle is well known in the art, and need not be specifically described. It is to be noted that, in accordance with the foregoing, the support frame for the present mounting means 10 comprises the spaced members 16 and 18, along with the interconnecting structure for these two supports, such as the front cross-plate 20 and the rear cross member 22, even though the latter may in certain instances consist of a portion of the undercarriage of the vehicle, upon which the support members are mounted. Also, the particular nature of the plow 12 is not considered to be a part of the invention and thus, while a specific type of plow currently in extensive use is illustrated, it will be understood that the present mounting means 10 may be used in connection with any implement which mounts upon a frame and is raised and lowered in actual usage.

In addition to the aforementioned frame means, the mounting means 10 of the invention includes a cylindrical support shaft 28 which is rotatably anchored on each of the spaced support members 16 and 18 and extends across these two members. Mounted on shaft 28 is a take-up drum means 30, described in more detail subsequently, to which is attached one end of a strong but flexible tension member, as for example a chain 32. The remaining end of this chain carries a curved hooking element 34 which fits over the top of the bumper 26 and consequently serves to suspend the support frame and take-up drum from the bumper. Finally, a power-operated driver means such as a hydraulic cylinder 36 or other such pressure-differential motor is provided for imparting rotation to the drum means 30 and thus raising the support frame and the implement 12 mounted thereon with respect to the vehicle 14 by winding some of the chain 32 upon the periphery of the take-up drum means 30. As illustrated, the power cylinder 36 has a fixed end anchored in a pivotal manner to the cross-member 22 of the support frame means. The plunger or ram portion 36a of the cylinder is pivotally attached to the take-up drum means 30 near its curved outer extremity, at a point spaced from the rotary shaft 28 upon which the drum means is mounted.

More specifically, the drum means 30 preferably comprises a semicircular segmental portion of a circumferentially grooved wheel 38, of the basic nature of a pulley wheel or sheave. Across the diameter of wheel portion 38 extends a brace 40, which maintains the curved wheel portion in a concentric position with respect to the rotary support shaft 28, which passes through the center of the brace 40. The lower end of chain 32 is secured to the curved peripheral portion of the drum means, within the groove of wheel segments 38, at a point thereon which is on the vehicle side of support shaft 28; also, the ram 36a of hydraulic cylinder 36 is preferably attached to the wheel 38 at this same point, as by a pivot pin 42.

The manner in which the present mounting means operates is graphically illustrated in FIGS. 2 and 3, FIG. 2 showing the implement in a lowered position and FIG. 3 showing it in a raised position. In the lowered position of FIG. 2, the pivot pin 42 securing the hydraulic ram to the drum means is positioned at least slightly below the level of the rotary support shaft 28 which mounts the drum means to the frame. Further, the point of connection of the chain 32 to the drum means is below, or on the vehicle side of, an imaginary line extending from the top of the bumper 26 through the support shaft 28. Consequently, when the power cylinder 36 is actuated, i.e., when it receives pressurized hydraulic fluid, the outward extension of its hydraulic ram 36a will rotate the take-up drum in a clockwise direction. This causes the wheel portion 38 of the drum to function as a take-up reel by winding some of the chain 32 about the grooved periphery of the wheel. This in effect shortens the operative length of the chain and, since the chain is in effect operatively connected to the frame by its attachment to the drum means, the chain thus draws the frame and the implement carried thereon upwardly, toward the bumper 26, which represents a fixed point with respect to the implement and its mounting apparatus (FIG. 3). As will be appreciated, the apparatus will lower the implement 12 by merely releasing the pressurized fluid actuating the power cylinder 36, since the weight of the implement and the frame means will easily cause retraction of the ram 36a. Consequently, power cylinder 36 need only be of the single-acting variety.

In this operation, the curved periphery of wheel 38 is of very considerable importance, since while the drum means 30 in effect provides a coupling linkage means between the hydraulic ram and the chain 32 by which the outward extension of the hydraulic ram exerts a pulling force on the chain, the amount of chain taken up for a given outward excursion of the ram is, of course, a function of the circumference of the wheel, and is thus significantly greater than if, for example, only an elongated, pivotally-mounted lever-type linkage were used between the chain 32 and the ram of the hydraulic cylinder, in a manner which has been utilized in the past. Thus, the utilization in the present invention of a form of take-up drum mounted on the same frame which supports the implement itself provides new operational benefits, as does the mutual cooperation of a hydraulic cylinder as the driving means for a rotary take-up drum arrangement. The drum means itself may, of course, incorporate a wheel which is a full circle, rather than the segmental circular portion shown at 38. However, the arrangement shown will provide very satisfactory operation, and at the same time is more compact.

As FIGS. 2 and 3 herein clearly illustrate, the entire mounting apparatus of the invention is located well below the level of the vehicle bumper. The power cylinder 36 is in the same general plane as the spaced support members 16 and 18, and may be said to be generally parallel to them which, in the terminology herein used, means at no more than a moderately acute angle with respect to these members. Additionally, it will be recognized that the entire apparatus, including the support members, the power cylinder, and the take-up drum, do not require an extensive amount of vertical space, and may be said to occupy the same general horizontal strata, i.e., they all lie within a horizontal layer whose vertical extent does not exceed the distance between the support members and the bumper, and preferably is considerably less than this.

It is entirely conceivable that upon examining the foregoing disclosure, those skilled in the art may devise particular embodiments of the concepts forming the basis of the invention which differ somewhat from the preferred embodiment shown and described herein, or may make various changes in structural details to the present embodiment. Consequently, it is to be recognized that the preferred embodiment shown and described is for purposes of general illustration only and is in no way intended to illustrate all possible forms of the invention.

I claim:

1. Means for movably mounting implements and the like upon a carrying vehicle, comprising in combination: a support frame means for mounting the implement, said frame means having a mounting portion by which it is pivotally attachable to such vehicle; a drum means having a curved winding portion mounted for rotation with respect to said frame means; a flexible tension member operably secured at a first point along its length to said drum means; means for anchoring said tension member at a second point along its length to a point located above said frame means with respect to said vehicle; and a power cylinder having a fixed end mounted upon said support frame means and a movable end attached to said drum means at a point spaced radially of the rotational center thereof to rotate said curved winding portion thereof to wind at least some of said tension member about at least a part of the periphery of said winding portion, thereby effectively shortening the distance between said spaced points and raising both said frame means and an implement mounted thereto toward said point above said frame means.

2. The mounting means for vehicular implements of claim 1, wherein said drum means comprises an element having a circularly curved outer periphery, bracing portions extending radially inwardly of said element from said periphery to the rotational center thereof, and a support shaft extending through said center for rotatably mounting said drum means, wherein said frame means comprises a pair of laterally spaced support members, said support shaft mounted on and extending between said spaced members, with said peripherally curved element located between the latter, wherein said driver means comprises a power cylinder, and wherein said power cylinder has a fixed end mounted upon said support frame means and a movable end attached to said drum means at a point spaced radially of the rotational center thereof.

3. The mounting means for vehicular implements of claim 2, wherein said frame means is pivotally attached to said vehicle such that said laterally spaced support members are disposed below the level of its bumper, and both said drum means and power cylinder are disposed in relatively close vertical proximity to said frame members, such that none of such components extend above said bumper.

4. Means for movably mounting implements and the like upon a carrying vehicle, comprising in combination: a rigid support frame means for mounting the implement, including at least one elongated member pivotally connectable at one end to the undercarriage of such vehicle to extend forwardly beyond the front of the vehicle, beneath the level of the bumper thereof; a tension member operatively connected between said vehicle and said frame means to raise and lower the latter with respect to said vehicle; a power cylinder having a size and shape and mounted such that it is substantially wholly located in the same horizontal strata as said elongated frame member and substantially entirely below the level of said bumper; and coupling linkage means connected between said tension member and said power cylinder to exert a pulling force on the former in response to actuation of the latter, to thereby raise said frame member upon such actuation.

5. The mounting means for vehicular implements of claim 4, wherein said power cylinder is elongated in form and located generally parallel to said frame member.

6. The mounting means for vehicular implements of claim 5, wherein said coupling linkage means includes a take-up drum having curved peripheral portions, and wherein said tension member is flexible and entrained at least in part over at least part of said curved drum portions, actuation of said cylinder winding said tension member further on said take-up drum.

References Cited

UNITED STATES PATENTS

| | | | |
|---|---|---|---|
| 2,166,424 | 7/1939 | Coates | 37—42 |
| 2,228,370 | 1/1941 | Schultz | 242—86 |
| 2,279,156 | 4/1942 | Barks et al. | 242—86 |
| 2,588,037 | 3/1952 | Orton | 254—150 |
| 2,867,921 | 1/1959 | Brown | 172—801 |
| 2,899,082 | 8/1959 | Meloy | 254—150 |

FOREIGN PATENTS 277,123  2/1913  Germany.

ROBERT E. PULFREY, Primary Examiner

E. H. EICKHOLT, Assistant Examiner

U.S. Cl. X.R.

37—50; 172—803, 467; 254—150